(12) United States Patent
Daniel

(10) Patent No.: US 9,031,606 B2
(45) Date of Patent: May 12, 2015

(54) LTE DATA CONNECTIVITY SOLUTION

(75) Inventor: Tom Daniel, Monmouth Jct., NJ (US)

(73) Assignee: Cellco Partnership, Basking Ridge, NJ (US)

( * ) Notice: Subject to any disclaimer, the term of this patent is extended or adjusted under 35 U.S.C. 154(b) by 411 days.

(21) Appl. No.: 13/475,743

(22) Filed: May 18, 2012

(65) Prior Publication Data
US 2013/0310022 A1 Nov. 21, 2013

(51) Int. Cl.
*H04M 1/00* (2006.01)
*H04W 24/00* (2009.01)

(52) U.S. Cl.
CPC .................................. *H04W 24/00* (2013.01)

(58) Field of Classification Search
USPC ............................. 455/552.1, 550.1, 436–444
See application file for complete search history.

(56) References Cited

U.S. PATENT DOCUMENTS

| | | | | |
|---|---|---|---|---|
| 5,448,763 A * | 9/1995 | Gillig | | 455/76 |
| 5,629,684 A * | 5/1997 | Isshiki et al. | | 340/4.35 |
| 2005/0027889 A1* | 2/2005 | Sandulescu | | 709/250 |
| 2009/0161627 A1* | 6/2009 | Ekambaram et al. | | 370/331 |
| 2009/0232097 A1 | 9/2009 | Taneja | | |
| 2010/0177737 A1* | 7/2010 | Song et al. | | 370/331 |
| 2012/0306774 A1* | 12/2012 | Lee et al. | | 345/173 |
| 2012/0327908 A1* | 12/2012 | Gupta et al. | | 370/331 |

OTHER PUBLICATIONS

Hyunseok Lee, "A Baseband Processor for Software Defined Radio Terminals," Dissertation submitted for the degrees of Doctor of Philosophy (Electrical Engineering and Computer Science) in The University of Michigan, 2007.

* cited by examiner

*Primary Examiner* — Marisol Figueroa

(57) ABSTRACT

A method and system is provided to control a mobile device. The method includes initially determining whether 4G network service is available. The network switch is set to a 4G baseband processor upon determining that 4G network service is available. The 4G network connection is monitored to determine whether a fault occurs. If so, the 4G baseband processor is reset. However, if 4G network service is not available, whether 3G network service is available is determined. If so, the network switch is set to a 3G baseband processor. When in 3G mode, the 3G network connection is monitored to determine whether a fault occurs. If so, whether a 4G network service is available is determined. Even if there is no fault with the 3G network, the mobile device switches to use the 4G network when the 4G network becomes available.

18 Claims, 4 Drawing Sheets

LTE DATA CONNECTIVITY SOLUTION

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as email, web browsing, as well as a variety of services using multimedia message service (MMS) technology.

To accommodate the increasing demand in wireless services, wireless packet data communication is being provided with ever increasing transmission speed. The packet data communication allows mobile device users to expand the scope of their use of the mobile device, for example, to enjoy multimedia services at a speed comparable to those enjoyed via Internet connected personal computers (PCs). The shift from third generation (3G) to fourth generation (4G) telecommunication data services marks another significant step in providing improved data service. The transition from 3G to 4G provides improvements both for the consumer as well as the provider. For example, download speeds in 4G can be about ten times faster than 3G, sometimes reaching residential broadband service speed. Further, the frequency spectrum used in 4G can better penetrate buildings, offering better signal strength. Also, 3G networks carry voice and Internet traffic while 4G networks are configured for Internet content, thereby reducing their footprint, complexity, and energy consumption. In this regard, 4G cell sites are typically a quarter to half the size of a 3G site and provide about five times better energy efficiency. In some estimates, the overall cost of operating a 4G network is 1/50 that of the 3G network.

Although both user and provider benefit from 4G technology, it is not sufficiently widespread in many areas. Therefore, until a complete transition to 4G occurs, many 4G mobile devices provide backward compatibility to 3G. Thus, despite 4G capability of a mobile device, it may still operate in 3G when the 4G signal is weak or non-existent, or simply stuck in 3G. Switching between the two networks creates a considerable lag as the mobile device reconnects. For example, every time there is a switch between 4G to 3G (or in reverse), a traffic channel is established between the mobile device and the respective network. In this regard, the associated subscriber account is authenticated and/or validated. Accordingly, a substantial amount of signaling (i.e., "handshaking") is typically performed between a mobile device and the respective network in order to facilitate communication through the network, which is not only network resource intensive but also degrades the user mobile device experience through slow performance or even loss of streamed data.

Further, while switching to 3G from 4G may be automatic, switching back is based on signal conditions. Even if switching to 4G were automatic, the mobile device may toggle back and forth between 3G and 4G as it tries to connect, consuming valuable network resources and draining mobile device battery in the process.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable refreshing of network connections when a failure in the connection is determined. Reference now is made in detail to the examples illustrated in the accompanying drawings and discussed below.

Figure 1:
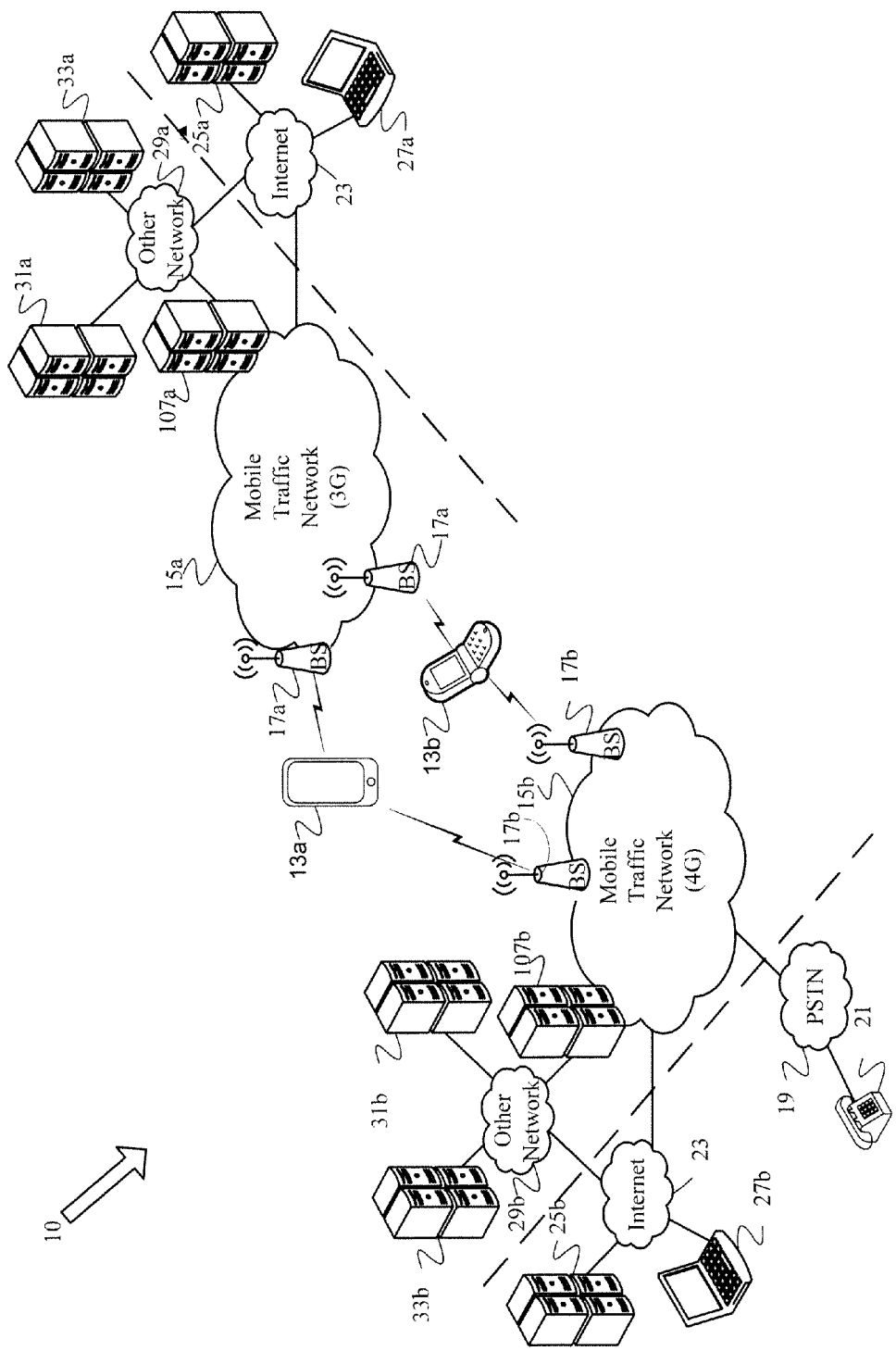
FIG. 1 illustrates a system providing a variety of mobile communication services to mobile devices or users.

FIG. 1 is a general diagram illustrating a system 10 offering a variety of mobile communication services to mobile devices or users. The example shows simply two mobile devices 13a and 13b as well as mobile communication networks 15a and 15b. The mobile devices 13a and 13b may be used for data services. The networks 15a and 15b provide mobile wireless communications services to those devices as well as to other mobile devices (not shown), for example, via a number of base stations 17a and 17b respectively. The present techniques may be implemented in any of a variety of available mobile networks 15a/b and/or on any type of mobile device compatible with such a networks 15a/b. The drawing shows only a very simplified example of a few relevant elements of the networks 15a and 15b for purposes of discussion.

The wireless mobile communication networks 15a and 15b may be implemented as a network conforming to different cellular standards, such as the Long Term Evolution (LTE) standard or other standards used for public mobile wireless communications. In the example of FIG. 1, mobile communication network 15a represents a 3G network whereas mobile communication network 15b represents a 4G network, based on the LTE standard. The LTE standard supports a full Internet Protocol (IP) network architecture and is designed to support voice and data in the packet domain. That is, in an LTE network voice calls are treated as data packets and exchange information through Voice-over-IP (VoIP) services. The mobile devices 13a and 13b are capable of voice telephone communications through the networks 15a and 15b, and for various data services, the exemplary devices 13a and 13b are capable of data communications through the particular type of networks 15a and 15b (and the users thereof will have subscribed to data service through the respective networks).

In our example, network 15b allows users of the mobile devices such as 13a and 13b (and other mobile devices not shown) to initiate and receive telephone calls to each other as well as through the public switched telephone network or "PSTN" 19 and telephone stations 21 connected to the PSTN. Networks 15a and 15b generally offer a variety of data services via the Internet 23, such as downloads, web browsing, email, etc. By way of example, the drawing shows a laptop PC type user terminals 27a and 27b as well as a servers 25a and 25b connected to the Internet 23; and the data services for the mobile devices 13 via the Internet 23 may be with devices like those shown at 25a/b and 27a/b as well as with a variety of other types of devices or systems capable of data communications through various interconnected networks.

Mobile devices 13a and 13b can take the form of portable handsets, smart-phones, tablets, or personal digital assistants, although they may be implemented in other form factors. Program applications and/or any application purchased on-line via a network can be configured to execute on many different types of mobile devices 13a/b. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication system 10 can be implemented by a number of interconnected networks. Hence, the overall system 10 may include a number of radio access networks (RANs), as well as regional ground networks interconnecting a number of RANs and a wide area network (WAN) interconnecting the regional ground networks to core network elements. A regional portion of the system 10, such as that serving mobile devices 13a/b, can include one or more RANs and a regional circuit and/or packet switched network and associated signaling network facilities.

Physical elements of a RAN operated by one of the mobile service providers or carriers include a number of base stations represented in the example by the base stations 17a/b. Although not separately shown, such base stations 17a/b can include a base transceiver system (BTS), which can communicate via an antennae system at the site of the base station and over the airlink with one or more of the mobile devices 13a/b, when the mobile devices are within range. Each base station can include a BTS coupled to several antennae mounted on a radio tower within a coverage area often referred to as a "cell." The BTS is the part of the radio network that sends and receives radio frequency (RF) signals to/from the mobile devices 13a/b that are served by the base stations 17a/b.

The radio access networks can also include a traffic network represented generally by the clouds at 15a and 15b, which carry the user communications and data for the mobile devices 13a/b between the respective base stations 17a/b and other elements with or through which the mobile devices communicate. The network can also include other elements that support functionality other than device-to-device media transfer services such as messaging service messages and voice communications. Specific elements of the networks 15a/b for carrying the voice and data traffic and for controlling various aspects of the calls or sessions through the network 15 are omitted here for simplicity. It will be understood that the various network elements can communicate with each other and other aspects of the mobile communications system 10 and other networks (e.g., the public switched telephone network (PSTN) and the Internet) either directly or indirectly.

The carrier will also operate a number of systems that provide ancillary functions in support of the communications services and/or application services provided through the networks 15a/b, and those elements communicate with other nodes or elements of the networks 15a/b via one or more private IP type packet data networks 29a/b (sometimes referred to as an Intranet), i.e., a private networks. Generally, such systems are part of or connected for communication via the private networks 29a/b. Of course, systems outside of the private network could serve the same functions as well. Examples of such systems, in this case operated by the network service provider as part of the overall networks 15a/b, which communicate through the intranet type networks 29a/b, include one or more application servers 31a/b and related authentication servers 33a/b for the application service of their respective servers 31a/b.

Mobile devices 13a/b communicate over the air with a base station (e.g., 17a or 17b) and through the respective traffic network 15a or 15b for various voice and data communications, e.g. through the Internet 23 with a respective server 25a/b and/or with respective application servers 31a/b. If the mobile service carrier offers various services, the services may be hosted on a carrier operated application server 31a/b, for communication via the networks 15a/b and 29a/b. Alternatively, the services may be provided by a separate entity (alone or through agreements with the carrier), in which case, the service may be hosted on an application server such as servers 25a/b connected for communication via the networks 15a/b and 23. Servers such as 25a/b and 31a/b may provide any of a variety of common application or service functions in support of or in addition to an application program running on the mobile devices 13a/b.

To insure that the application service offered by server 31a or 31b is available to only authorized devices/users, the provider of the application service also deploys respective authentication servers 33a and 33b. The authentication servers 33a/b could be separate physical servers as shown, or authentication server 33a/b could be implemented as another program module running on the same hardware platform as the server application 31a/b. Essentially, when the server application (servers 31a/b in our example) receives a service request from a client application on a mobile device 13a/b, the server application provides appropriate information to the respective authentication server 33a/b to allow server application 33a/b to authenticate the mobile device 13a/b. Upon successful authentication, the server 33a/b informs the respective server application 31a/b, which in turn provides access to the service via data communication through the various communication elements (e.g. 29a/b, 15a/b, and 17a/b respectively) of the system 10. A similar authentication function may be provided for various mobile service(s) offered via the server 25a/b, either by the server 33a/b if there is an appropriate arrangement between the carrier and the operator of server 25a/b, by a program on the server 25a/b or via a separate authentication server (not shown) connected to the Internet 23.

At least for some of the data services, the mobile device 13a/b links through the mobile communication network 15a/b to a carrier gateway 107a/b to access relevant carrier network resources and to establish data communications through the network with data services offered by the network carrier and/or other service providers represented by the application servers 31a/b in the drawing. The carrier gateway 107a/b may be a base station, network switch, and/or gateway server resident in or on the periphery of the carrier's mobile communication network. In one example, the carrier gateway 107 authenticates the mobile device 13a/b and, upon successful authentication, allows the mobile device 101 to access network provided communication services. Although only one gateway 107a/b is shown for each network for convenience, there may be any number of such gateways in or coupled to the respective wireless communication network.

Figure 2:
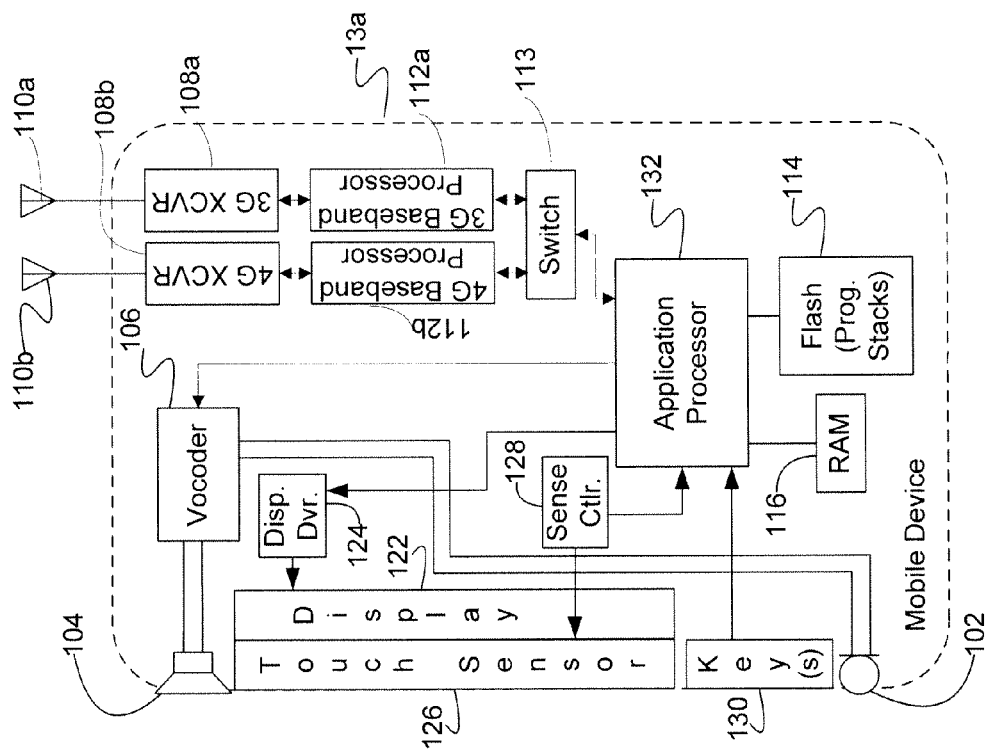
FIG. 2 illustrates a high level simplified function block diagram of an exemplary mobile device.

It may be useful to consider the functional elements/aspects of an exemplary mobile device 13a at a high-level. For purposes of discussion, FIG. 2 illustrates a high level simplified function block diagram of an exemplary mobile device 13a. Specifically, it provides a block diagram illustration of an exemplary touch screen mobile device 13a.

For digital wireless communications, the handset 13a also includes two transceivers (XCVR) 108a and 108b for 3G and 4G respectively. The concepts discussed here encompass embodiments of the mobile device 13a utilizing any digital transceivers that conform to current or future developed digital wireless communication standards.

Each transceiver 108a and 108b provides two-way wireless communication of information, such as vocoded speech samples and/or digital message information, in accordance with the technology of the system 10. In this example, the transceivers 108a and 108b also send and receive a variety of signaling messages in support of the various voice and data services provided via the mobile device 13a and the communication network, in this case. Each transceiver 108a/b connects through RF send and receive amplifiers (not separately shown) to its respective antenna 110a/b. In the example, the transceivers 108a/b are configured for RF communication in accord with a digital wireless protocol, such as the current (i.e., at the filing of this application) 3GPP2 (e.g. CDMA) and 3GPP protocols (e.g., GSM and LTE) consistent with 3G, 4G, and beyond.

Each transceiver corresponds to its respective baseband processor (e.g., 112a and 112b). A baseband processor is an integrated circuit (IC) that performs various signal processing functions, including processing of digitized information from and to its corresponding transceiver (e.g., 108a or 108b) within the mobile device 13a. Depending on the system architecture of a mobile device 13a, the digital signal processing functions of a baseband processor may include voice coding/decoding, channel coding/decoding, equalization, digital modulation/demodulation, etc. in accordance with the technology of its respective network 15a or 15b.

At a high level, for transmission of data, the baseband processor (e.g., 112a or 112b) receives outbound data and provides digitally processed transmit data to its respective transceiver 108a or 108b for transmitting them through RF send amplifier (not shown) to its corresponding antenna 110a or 110b. Likewise, for reception of data, the baseband processor (e.g., 112a or 112b) receives receive data from its corresponding transceiver 108a or 108b via RF receive amplifier (not shown) and its corresponding antenna 110a or 110b, processes them and provides the data to the application processor 132 which ultimately outputs the digitally processed data to various components such as display 118, speaker 104, application processor 132 via switch 113, application software, etc. The application processor 132 determines whether a 3G or a 4G network connection would be more appropriate at any given moment. In this regard, the application processor 132 communicates with the 3G network or 4G network through either the 3G baseband processor 112a or 4G baseband processor 112b, respectively, via switch 113. Thus, the application processor 132 controls the switch 113 to connect either to 3G network or 4G network. The application processor 132 knows which network (e.g., 3G or 4G) is more appropriate by periodically sampling each network. For example, when in 4G mode, the switch 113 is periodically switched to 3G mode for a predetermined time to determine whether 3G connectivity is available and what the signal strength is. Similarly, when in 3G mode the switch 113 is periodically switched to 4G mode for a predetermined time to determine whether 4G connectivity is available and what the signal strength is. In one example, the application processor 132 stays at 4G mode upon determining that 4G connectivity is available and the signal strength is above a predetermined threshold level.

The mobile device 13a includes a display 122 for displaying messages, menus or the like, call related information dialed by the user, calling party numbers, etc. The wireless mobile device 13a also includes a touch/position sensor 126. The sensor 126 is relatively transparent, so that the user may view the information presented on the display 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the mobile device 13a. The microphone 102 and speaker 104 may be used as additional user interface elements, for audio input and output. Of course, other user interface elements may be used, such as a trackball, as in some types of PDAs or smart phones.

Mobile device 13a may also include a haptic element (not shown) to provide haptic feedback to the user. Various combinations of the keypad 120, display 122, microphone 102, haptic element, and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections, for example, including any notification on respective signal strength of the 3G and 4G networks, which network the mobile device is currently connected with, and whether to perform a network reset.

In the example of FIG. 2, the application processor 132 serves as a programmable controller or processor for the mobile device 13a, in that it controls all operations of the mobile device 13a in accord with programming that it executes, for all normal operations, and for operations involved in selection and resetting of the wireless network consideration here. For example, the application processor 132 may manage application operation such as processing emails with images, playing video and audio, and supporting video telephony and similar multimedia applications. While running various applications for the user of the mobile device 13a, the application server 132 may communicate at the same time with either 3G baseband processor 112a or 4G baseband processor 112b.

In the example, the mobile device 13a includes flash type program memory 114, for storage of various "software" or "firmware" program routines and mobile configuration settings, such as mobile telephone number (MTN or MDN), etc. The mobile device 13a may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the application processor 132.

As outlined above, the mobile device 13a includes an application processor 132, and programming stored in the flash memory 134 configures the application processor 132 so that the mobile device 13a is capable of performing various functions, including functions involved in the technique for selecting a 3G or 4G network, switching to either a 3G or 4G network, and resetting a faulty connection with any network.

Figure 3:
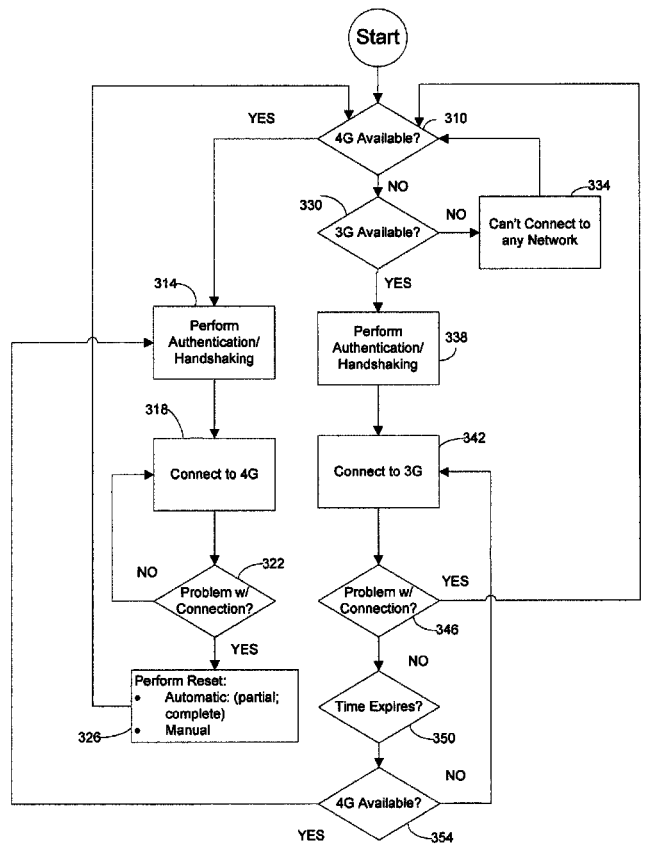
FIG. 3 provides an exemplary flow wherein a mobile device determines selects 3G or 4G service and identifies faults with the service connection.

Reference now is made to FIG. 3, which provides an exemplary flow of 3G or 4G network selection in the context of a mobile device. FIG. 3 can be best understood in connection with FIGS. 1 and 2. Accordingly, references are made to components of FIGS. 1 and 2. For discussion purposes, illustrations in FIG. 1 are only conceptual leaving out many known details of signaling over the air between a mobile device and a mobile communication network. FIG. 1 illustrates two networks (i.e., 15a and 15b) that could be used during operation of the mobile device 13a for wireless communication. In an LTE network, all-IP network architecture of LTE technology provides that all information, including voice, is treated as data packets. That is, even voice gets treated as data packets and gets Voice-Over-IP (VoIP) services. Hence, all communications require a data session attachment or a data call connection through the LTE network 15a or 15b. For example, when a mobile device 13a is powered up, preference is shown to connecting to a 4G network. Thus, in step 310, a determination is made whether 4G service is available. If so, the application processor 132 instructs the switch 113 to select the 4G baseband processor 112b so that the application processor 132 is connected with the 4G baseband processor 112b. For example, the application processor determines the availability of the 4G network service by determining whether a 4G network signal strength is above a predetermined threshold. As discussed before, the application processor 132 periodically changes the position of the switch 113 (e.g., from 3G to 4G or in reverse) to determine the availability and signal strength of the other network. Thus, while in 3G mode, the switch 113 is set to 4G mode periodically for a predetermined time to determine the status (availability and strength) of the 4G network.

In step 314, the mobile device 13a attempts registration with a 4G network 15b for services. For example, mobile device 13a initiates communication with an authentication server 33b. In accordance with the technology adopted by the network (4G in this example), a series of exchanges of messages occurs between the mobile device 13a and the network 15a and/or network 15b. If the mobile device 13a is successfully authenticated, then the mobile device 13a receives a confirmation from the base station 17b.

In step 318, upon receiving the confirmation message, a connection is established with the 4G network 15b. The baseband processor 112b then generates a second confirmation to be sent to the application processor 132, thereby informing the application processor 132 that the mobile device 13a is successfully authenticated and connected to the 4G network 15b.

The application processor 132 monitors whether there is a fault with the 4G network connection (i.e., step 322). For example, a fault may be indicated if a confirmation is not received within a first predetermined time from the baseband processor 112b or the mobile device toggles back and forth between 3G and 4G (e.g., a network configurable) predetermined number of times within a second predetermined time. For example, the first and second predetermined time and the predetermined number of times are pre-programmed in a memory (e.g., 116 or 114) of the mobile device 13a. These criteria (i.e., thresholds) may be different for different times of the day and geographic location. Further, these criteria may be changed by upgrading the application program that runs these features.

What can cause a faulty condition includes signal degradation over the 4G wireless connection, oversaturation (e.g., too many users and/or too many data transactions) of the 4G wireless network, IP packets that are corrupted during transmission, and the like. For example, although signal degradation or usage may not normally be sufficient to trigger movement to 3G, as the number of times toggling occurs increases, it may meet the predetermined criterion (e.g., the threshold predetermined number of times the toggling occurs that is preprogrammed in the memory of the mobile device). If the application processor 132 does not receive a successful transmission to or from the 4G network within a predetermined time, the application processor 132 interprets the lack of acknowledgment as an indication of a fault.

In one embodiment, if a determination of a fault is made by the application processor 132, a reset may be performed in step 326. The reset may be automatic or manual.

For example, in an automatic reset, the system clock of the 4G baseband processor 112b and the 3G baseband processor 112a may be reset. In another example, only the clock of the 4G baseband processor 112b is reset while the 3G baseband processor 112a is allowed to continue, in order to provide the user of the mobile device 13a data connectivity while the reset is being performed. Alternatively, the power supply to the 4G baseband processor 112a (and/or 3G baseband processor 112a) is reset, which also resets the 3G and/or 4G clock respectively. For example, the power supply to the respective baseband processor(s) may be turned off for a predetermined time. When both the 3G and 4G baseband processors are reset, the reset may be simultaneous or in series.

In yet another example, there may be a manual reset by the user. For example, when a fault is determined by the application processor 132, a notification on the user interface 126 of the mobile device 13a may be provided by the application processor, thereby indicating that there is a fault with the 4G network connection. Further, there may be a prompt on the user interface of the mobile device to reset the network connection. For example, there may be a recommendation to press a button on the screen to manually reset the 4G network connection as discussed above. For example, the notification may be a message (e.g., pop-up) on the screen of the mobile device, an audible tone, a haptic signal, or any combination thereof If a fault is not detected, the mobile device 13a remains connected to the 4G network. Thus the application processor 132 maintains the switch 113 in the 4G mode, thereby maintaining communication with the 4G baseband processor 112b and the 4G network through the 4G antenna 110b and the 4G transceiver 108b.

Going back to step 310, if a 4G network connection is not available, an attempt is made to connect to 3G. Of course, if 3G is also unavailable then the 3G/4G network connection cannot be established (i.e., step 334). In step 330 the application processor 132 determines whether the 3G network is available by determining whether a 3G signal strength is above a predetermined threshold. This threshold may be the same or different from the predetermined threshold of the 4G signal strength. In step 338, upon determining that the 3G network is available (while 4G is not available), the mobile device 13a attempts to register with a 3G network 15a for services. For example, mobile device 13a initiates communication with an authentication server 33a. If the mobile device 13a is successfully authenticated, then the mobile device 13a receives a confirmation, through the base station 17a.

In step 342, upon receiving the confirmation message, a connection is established with the 3G network 15a. The baseband processor 112a then generates a second confirmation to be sent to the application processor 132, thereby informing the application processor 132 that the mobile device 13a is successfully authenticated and connected to the 3G network 15a.

In step 346, the application processor 132 monitors whether there is a fault with the 3G network connection. For example, a fault may be indicated when a confirmation is not received within a predetermined time from the baseband processor 112b or when the mobile device toggles back and forth between 3G and 4G. In one example, if a fault is determined, the method goes back to determining whether a 4G network connection is available (i.e., step 310).

However, if no fault is detected in step 346, then the system remains connected to 3G. In one example, a periodic determination is made whether 4G is available. Put differently, after every predetermined time period (step 350) the application processor 132 determines whether 4G is within range (step 354). The time period can vary (e.g., as defined by the network), or may be independent of any external conditions. If 4G is not available, the mobile device remains connected to 3G. However, if 4G is within range, the method continues with step 314 by attempting to register with the 4G network 15b for services. In this regard, switch 113 is set to connect the application processor 132 with the 4G baseband processor 112b by the application processor 132, thereby handing over the network connection from 3G to 4G.

In yet another example, step 350 is eliminated and the determination in step 354 is asynchronous. Put differently, the application processor 132 does not wait a fixed predetermined time to determine whether 4G is available; rather, it makes an asynchronous determination. As soon as 4G becomes available, the application processor 132 immediately initiates registration with a 4G network 15b for services.

Figure 4:
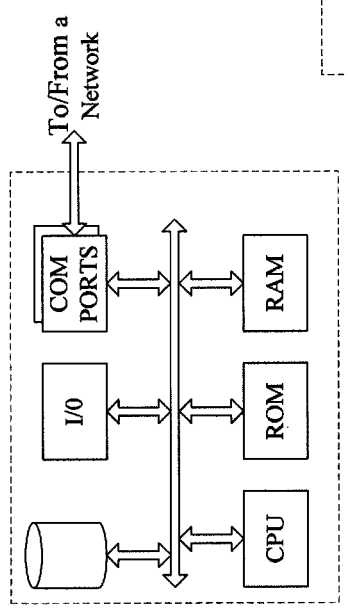
FIG. 4 illustrates a network or host computer.
Figure 5:
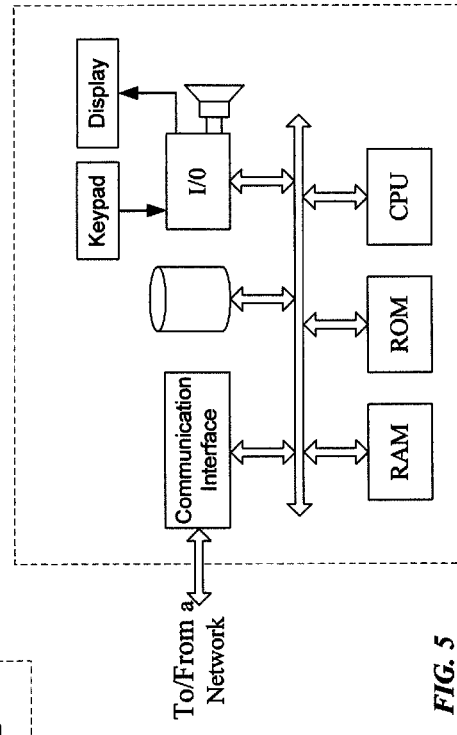
FIG. 5 depicts a computer with user interface elements.

FIGS. 4 and 5 provide functional block diagram illustrations of general purpose computer hardware platforms. FIG. 4 illustrates a network or host computer platform, as may typically be used to implement a server. FIG. 5 depicts a device with user interface elements, as may be used to implement a personal computer or workstation or to implement a mobile device, such as a portable handset, a smart-phone, tablet computer, a personal digital assistant or other type of mobile station or mobile terminal device, although the device of FIG. 5 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run, for example, application servers 31a/b and related authentication servers 33a/b for the application service of their respective servers 31a/b in FIG. 1.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g. files used for the user applications, and/or pull client application. The software code is executable by the mobile device that functions as the pull client. In operation, the code is stored within the mobile device. At other times, however, the software may be stored at other locations and/or transported for loading into the appropriate mobile device system. Execution of such code by a processor of the mobile device enables the mobile device to implement respective aspects of the 3G or 4G mobile network selection and reset methodology, in essentially the manner performed in the implementations discussed and illustrated herein.

Hence, aspects of the methods of pull data service outlined above may be embodied in programming. Program aspects of the technology may be thought of as "products" or "systems of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

3G—Third Generation Telecommunication
    3GPP2—3'rd Generation Partnership Project 2
    4G—Fourth Generation Telecommunication
    BS—Base Station
    BTS—Base Transceiver System
    CDMA—Code Division Multiple Access
    CPU—Central Processing Unit
    EPROM—Erasable Programmable Read Only Memory
    EEPROM—Electrically Erasable Programmable Read Only Memory
    GUI—Graphical User Interface
    IC—Integrated Circuit
    ID—Identification
    IP—Internet Protocol
    IT—Information Technology
    LTE—Long Term Evolution
    MD—Mobile Device
    MDN—Mobile Directory Number
    MMS—Multimedia Messaging Service
    MTN—Mobile Telephone Number
    PC—Personal Computer
    PROM—Programmable Read Only Memory
    PSTN—Public Switched Telephone Network
    RAM—Random Access Memory
    RAN—Radio Access Network
    RF—Radio Frequency
    ROM—Read Only Memory
    SMS—Short Message Service
    VoIP—Voice over Internet Protocol
    WAN—Wide Area Network

What is claimed is:

1. A mobile device comprising:
an application processor;
a network switch coupled to the application processor;
a third generation (3G), baseband processor coupled to the switch;
a fourth generation (4G) baseband processor coupled to the switch;
a 3G transceiver coupled to the 3G baseband processor;
a 4G transceiver coupled to the 4G baseband processor;
wherein the application processor is configured to:
determine whether a 4G network service is available;
upon determining that the 4G network service is available:
  set the network switch to connect the application processor with the 4G baseband processor;
  monitor whether there is at least one fault with the 4G network connection;
  upon determining that there is at least one fault with the 4G network connection:
    initiate a reset of the 4G baseband processor;
upon determining that the 4G network service is not available:
  determine whether a 3G network service is available;
  upon determining that the 3G network service is available:
    set the network switch to connect the application processor with the 3G baseband processor;
    monitor whether there is at least one fault with the 3G network connection;
    upon determining that there is no fault with the 3G network connection:
      maintain the connection of the application processor with the 3G baseband processor for a predetermined time, and
    upon detecting at least one fault with the 3G network connection, or upon determining that there is no fault with the 3G network connection and that the predetermined time has expired, going back to the step of determining whether the 4G network service is available,
wherein the at least one fault with the 3G or 4G network connection is triggered according to criteria that are related to the, at least one fault, and the criteria are dependent on respectively different geographic locations of the mobile device and on respective times of a day.

2. The mobile device of claim 1, wherein the application processor is configured to determine the availability of the 3G or 4G network service by determining whether a 3G signal is above a first predetermined threshold and a 4G signal is above a second predetermined threshold, respectively.

3. The mobile device of claim 1, wherein the application processor is further configured to initiate communication with a 3G or 4G authentication server upon determining that the 3G or 4G network service is available, respectively.

4. The mobile device of claim 3, wherein the at least one fault with the 3G or 4G network connection is detected from a group consisting of: (i) a first type of fault that is related to failure to receive a confirmation from the respective authentication server within a first predetermined time; (ii) a second type of fault that is related to toggling more than a predetermined number of times between the 3G and 4G network within a second predetermined time; and (iii) a third type of fault that is related to failure of the application processor to acknowledge transmission to or from the 3G or 4G network within the first predetermined time, and wherein:

the first predetermined time is set in the mobile device as a first criterion that triggers the first type of fault and the third type of fault;

the second predetermined time and the predetermined number of times of toggling between the 3G and 4G network, are set in the mobile device as a second criterion and a third criterion, respectively, that trigger the second type of fault.

5. The mobile device of claim 1, wherein the application processor is configured to initiate a reset by at least one of:
(i) providing a notification on a user interface of the mobile device to manually reset the 4G baseband processor; or
(ii) automatically resetting the 4G baseband processor.

6. The mobile device of claim 5, wherein the application processor is configured to reset the 4G baseband processor by at least resetting a clock of the 4G baseband processor.

7. The mobile device of claim 5, wherein the application processor is configured to reset the 4G baseband processor by at least turning off a power supply to the 4G baseband processor for another predetermined time.

8. The mobile device of claim 5, wherein the application processor is configured to reset the 3G baseband processor at the same time as the 4G baseband processor.

9. The mobile device of claim 5, wherein the notification includes one of at least a message on a screen of the mobile device, an audible tone, a haptic signal, or any combination thereof.

10. A method comprising:
determining whether a fourth generation (4G) network service is available;
upon determining that the 4G network service is available:
setting a network switch to connect an application processor with a 4G baseband processor;
monitoring whether there is at least one fault with a 4G network connection; and
upon determining that there is at least one fault with the 4G network connection:
initiating a reset of the 4G baseband processor;
upon determining that the 4G network service is not available:
determining whether a third generation (3G) network service is available;
upon determining that the 3G network service is available:
setting a network switch to connect the application processor with a 3G baseband processor;
monitoring whether there is at least one fault with a 3G network connection;
upon determining that there is no fault with the 3G network connection:
maintaining the connection of the application processor with the 3G baseband processor for a predetermined time, and
upon detecting at least one fault with the 3G network connections upon determining that there is no fault with the 3G network connection and that the predetermined time has expired, going back to the step of determining whether the 4G network service is available, wherein the at least one fault with the 3G or 4G network connection is triggered according to criteria that are related to the at least one fault, and the criteria are dependent on respectively different geographic locations of the mobile device, and on respective times of a day.

11. The method of claim 10, wherein determining whether 3G or 4G network service is available comprises determining whether a 3G signal is above a first predetermined threshold and a 4G signal is above a second predetermined threshold, respectively.

12. The method of claim 10, further comprising initiating communication with the 3G or 4G authentication server upon determining that the 3G or 4G network service is available, respectively.

13. The method of claim 12, wherein the at least one fault with the 3G or 4G network is detected from a group consisting of: (i) a first type of fault that is related to failure to receive a confirmation from the respective authentication server within a first predetermined time; (ii) a second type of fault that is related to toggling more than a predetermined number of times between the 3G and 4G network within a second predetermined time; and (iii) a third type of fault that is related to failure of the application processor to acknowledge transmission to or from the 3G or 4G network within the first predetermined timer, and wherein:

the first predetermined time, is set in the mobile device, as a first criterion that triggers the first type of fault and the third type of fault;

the first predetermined time, is set in the mobile device, as a first criterion that triggers the first type of fault and the third type of fault;

the second predetermined time, and the predetermined number of times of toggling between the 3G and 4G network, are set in the mobile device, as a second criterion and a third criterion respectively that trigger the second type of fault.

14. The method of claim 10, further comprising initiating a reset by at least one of:
(i) providing a notification on a user interface of the mobile device to manually reset the 4G baseband processor; or
(ii) automatically resetting the 4G baseband processor.

15. The method of claim 14, wherein resetting the 4G baseband processor comprises at least resetting a clock of the 4G baseband processor.

16. The method of claim 14, wherein resetting the 4G baseband processor comprises at least turning off a power supply to the 4G baseband processor for another predetermined time.

17. The method of claim 14, further comprising resetting the 3G baseband processor at the same time as the 4G baseband processor.

18. The method of claim 14, wherein providing the notification comprises providing one of at least a message on a screen of the mobile device, an audible tone, a haptic signal, or any combination thereof.

* * * * *